(12) United States Patent
Ganesan

(10) Patent No.: US 11,075,016 B2
(45) Date of Patent: Jul. 27, 2021

(54) FLOATING NUCLEAR REACTOR

(71) Applicant: Palvannanathan Ganesan, Omaha, NE (US)

(72) Inventor: Palvannanathan Ganesan, Omaha, NE (US)

( * ) Notice: Subject to any disclaimer, the term of this patent is extended or adjusted under 35 U.S.C. 154(b) by 174 days.

(21) Appl. No.: 16/387,764

(22) Filed: Apr. 18, 2019

(65) Prior Publication Data

US 2019/0244718 A1    Aug. 8, 2019

Related U.S. Application Data

(63) Continuation-in-part of application No. 15/807,182, filed on Nov. 8, 2017, now Pat. No. 10,714,221.

(51) Int. Cl.
| | |
|---|---|
| *G21C 13/024* | (2006.01) |
| *B63B 21/00* | (2006.01) |
| *G21C 9/04* | (2006.01) |
| *G21D 1/00* | (2006.01) |
| G21C 9/00 | (2006.01) |

(52) U.S. Cl.
CPC ............ *G21C 13/024* (2013.01); *B63B 21/00* (2013.01); *G21C 9/04* (2013.01); *G21D 1/00* (2013.01); *G21C 9/001* (2013.01)

(58) Field of Classification Search
CPC ...... G21C 13/02; G21C 13/024; G21C 11/04; G21G 1/00; B63B 21/00; B63B 21/20; B63B 21/50; B63B 2207/00; B63B 2207/02; B63B 2207/04; G21D 1/00

USPC .......... 114/230.1, 0.2, 0.22, 0.24, 0.25, 0.26, 114/0.27
See application file for complete search history.

(56) References Cited

U.S. PATENT DOCUMENTS

| | | | | |
|---|---|---|---|---|
| 3,837,308 | A * | 9/1974 | Harvey | G21D 1/00 114/264 |
| 4,740,108 | A * | 4/1988 | Levee | E02B 3/068 405/196 |
| 5,247,553 | A * | 9/1993 | Herring | G21C 1/08 376/284 |
| 5,265,553 | A * | 11/1993 | Brydges | E02B 3/24 114/230.22 |
| 8,453,590 | B1 * | 6/2013 | Pittman | B63B 21/00 114/230.24 |
| 8,867,691 | B1 * | 10/2014 | Root | B63B 27/143 376/277 |
| 9,378,855 | B2 | 6/2016 | Ganesan | |
| 9,396,823 | B2 | 7/2016 | Ganesan | |
| 9,502,143 | B2 | 11/2016 | Ganesan | |

\* cited by examiner

*Primary Examiner* — Sharon M Davis
(74) *Attorney, Agent, or Firm* — Dennis L. Thomte; Thomte Patent Law Office LLC

(57) ABSTRACT

A nuclear reactor is positioned on a barge which is floating in a water tank. A plurality of counter weight assemblies interconnect the barge with the tank to create a lifting force to the barge and to maintain the barge in a level position. Structure is also included for limiting horizontal movement of the counter weight of the counter weight assemblies.

7 Claims, 9 Drawing Sheets

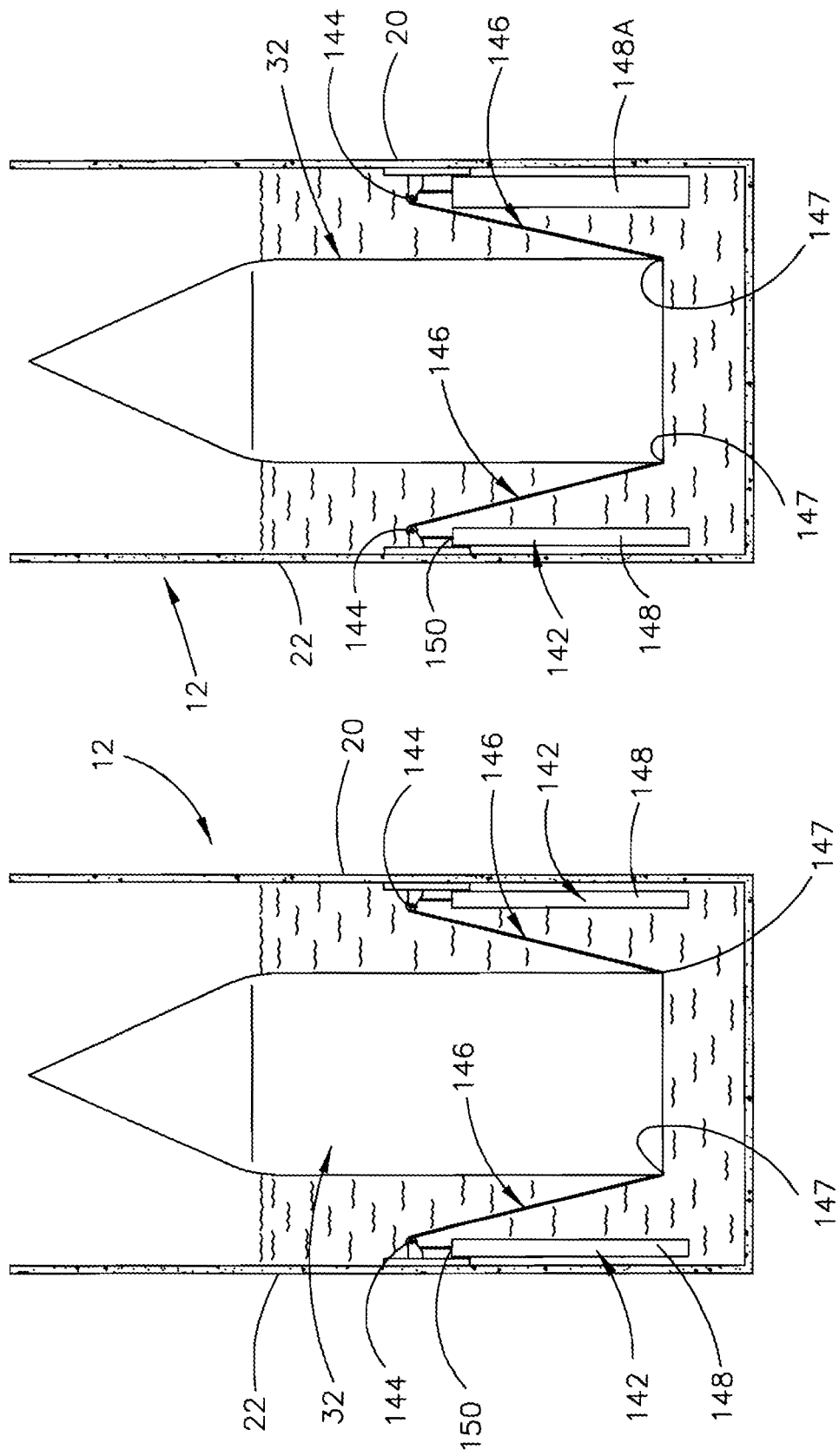

FLOATING NUCLEAR REACTOR

CROSS REFERENCE TO RELATED APPLICATION

This is a Continuation-In-Part Application of application Ser. No. 15/807,182 filed Nov. 8, 2017, entitled FLOATING NUCLEAR REACTOR PROTECTION SYSTEM.

BACKGROUND OF THE INVENTION

Field of the Invention

This invention relates to a floating nuclear power reactor. More particularly this invention relates to a floating nuclear power reactor including a barge which is floatably positioned in the interior of a large water-filled tank and wherein the nuclear power reactor is positioned on the barge. Even more particularly, the invention relates to a counter weight system which creates a lifting force to the barge to increase the buoyancy thereof. Even more particularly, the invention relates to a counter weight system which maintains the barge in a level condition with respect to the water-filled tank. Even more particularly, the invention relates to structure which permits normal vertical movement of the counter weights while preventing horizontal movement of the counter weights in the event of an earthquake.

Description of the Related Art

Applicant has received U.S. Pat. Nos. 9,378,855; 9,396,823; and 9,502,143 relating to nuclear reactors positioned in a body of water or tank to be able to flood and cool the nuclear reactor in the event of overheating or over pressurization of the nuclear reactor. In Applicant's latest invention shown and described in the co-pending application Ser. No. 15/807,182 filed Nov. 8, 2017, a suspension system is described for suspending and stabilizing a barge which is floating in a large water tank.

The barges of Applicant's prior patents and patent applications, due to engineering requirements, may become too heavy to float in the water tank. Further, one side of the barge may be heavier than the other side of the barge which makes it difficult to maintain the barge in a level condition. Additionally, one end of the barge may be heavier than the other end of the barge which also makes it difficult to maintain the barge in a level condition.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A floating nuclear reactor is disclosed. The floating nuclear reactor of this invention includes a tank, which may be rectangular, having a bottom wall, an upstanding first end wall, an upstanding second end wall, an upstanding first side wall and an upstanding second side wall. Each of the first end wall, the second end wall, the first side wall and the second side wall of the tank have an outer side, an inner side, a lower end and an upper end. The tank may be partially or fully buried in the ground with the tank having water therein. A barge is floatably positioned in the tank with the barge having a bottom wall, a first end wall, a second end wall, a first side wall and a second side wall. A nuclear reactor is positioned on the barge.

At least one, and preferably a plurality of counter weight assemblies are secured to each of the first end wall, the second end wall, the first side wall and the second side wall of the barge. Each of the counter weight assemblies includes an elongated cable, having first and second ends, with the first end of the cable being secured to the barge. The cable extends from the barge and passes over a pulley mounted on the tank. The second end of the cable has a counter weight secured thereto. The counter weight assemblies create a lifting force to the barge to increase the buoyancy thereof and to maintain the barge in a level condition. If one side of the barge is heavier than the other side of the barge, the weights of the counter weights at the heavy side may be increased. If one end of the barge is heavier than the other end of the barge, the weights of the counter weights at the heavy end of the barge may be increased. The increased weights of the counter weights will maintain the barge in a level condition. In the alternative, an additional counter weight assembly may be positioned at the heavier side or end of the barge. The counter weights are vertically movable in channels which prevent other movement of the counter weights during an earthquake.

It is therefore a principal object of the invention to provide a floating nuclear reactor which is positioned on a barge which floats in a water filled tank.

A further object of this invention is to provide counter weight assemblies which are attached to the barge to provide a lifting force to the barge to increase the buoyancy of the barge.

A further object of this invention is to provide counter weight assemblies which are attached to the barge to maintain the barge in a level position.

Yet another objective of the invention is to provide a counterweight that moves only vertically during an earthquake.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 is a sectional view illustrating the barge floating in a water-filled tank with a pair of counter weight assemblies being connected to the barge and the water tank;

FIG. 8 is a view similar to FIG. 7 except that one of the counter weight assemblies has a larger and heavier counter weight than in FIG. 7 to compensate for the right-hand side of the barge being heavier than the left-hand side of the barge to maintain the barge in a level condition;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U.S. Pat. Nos. 9,378, 855; 9,396,823; and 9,502,143 relating to floating nuclear power reactors. Applicant incorporates the disclosure of the above identified patents in their entirety by reference thereto to complete this disclosure if necessary.

Figure 1:
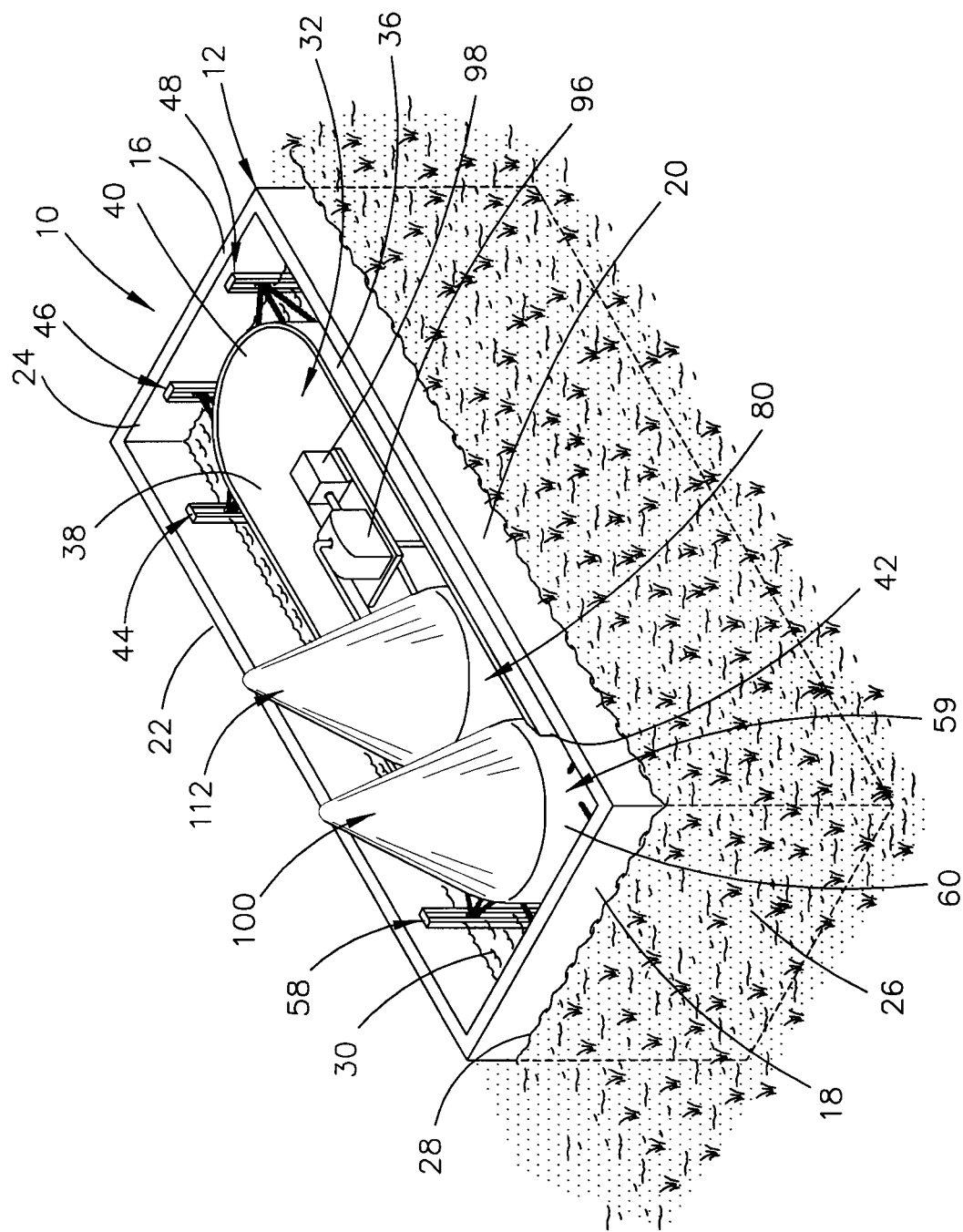
FIG. 1 is a perspective view of a nuclear power reactor floating in a water tank.
Figure 2:
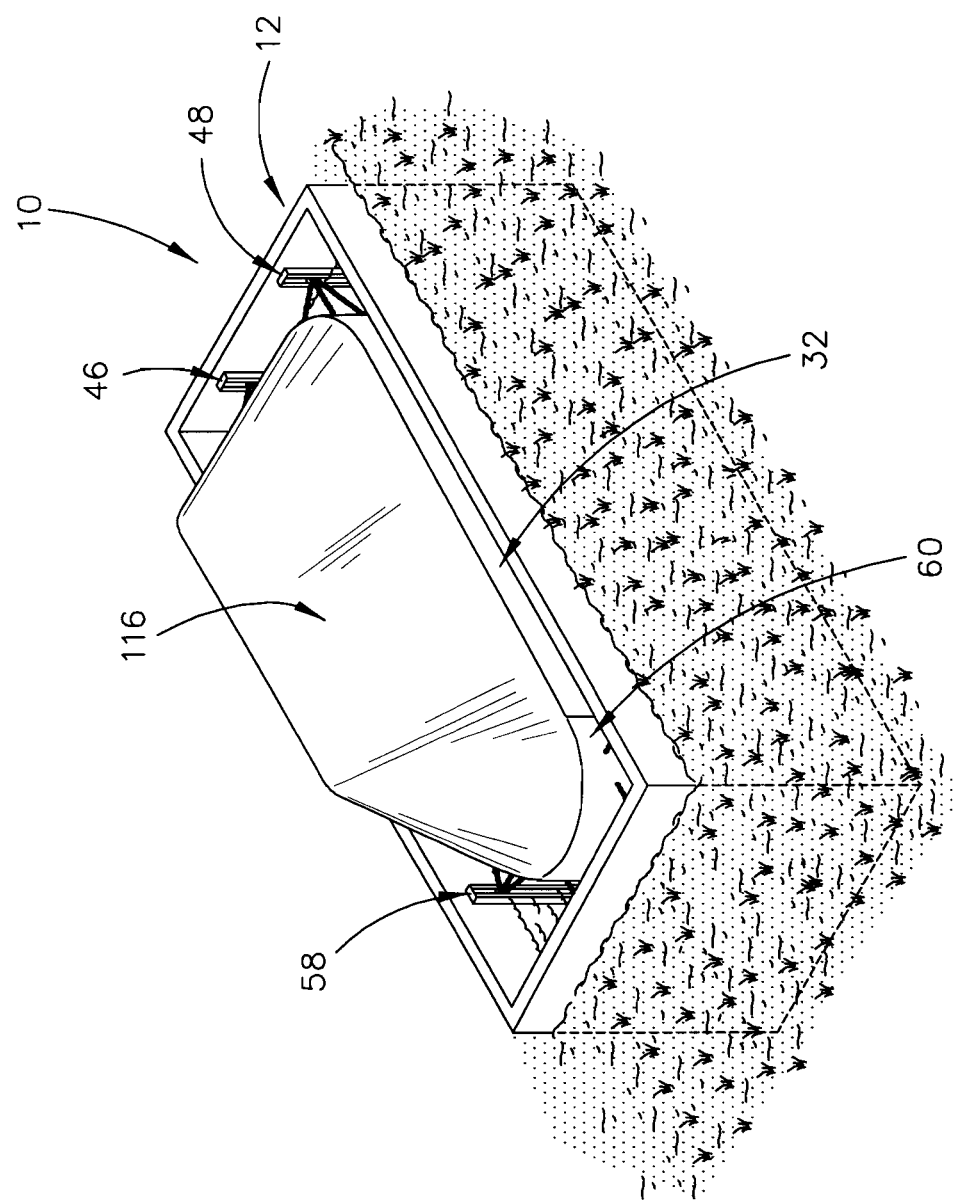
FIG. 2 is a perspective view similar to FIG. 1 except that a roof structure is positioned over the nuclear reactor and the barge.

The floating nuclear reactor of this invention is referred to generally by the reference numeral 10. The nuclear reactor 10 floats in a concrete tank 12 having a bottom wall 14, a first end wall 16, a second end wall 18, a first side wall 20, a second side wall 22 and an open upper end 24. Tank 12 is buried in the ground 26 as seen in FIG. 1 so that the open upper end 24 of tank 12 is at or above ground level 28. The tank 12 is partially filled with water 30 from a source of water. Preferably the water 30 is gravity fed to the tank 12. The tank 12 may be completely buried in the ground.

The numeral 32 refers to a barge-like vessel which floats in the tank 12. Barge 32 includes a bottom wall 34, a first side wall 36, a second side wall 38, a semi-circular end wall 40 and an open end 41 at the ends 42 and 43 of side walls 36 and 38 respectively. Barge 32 is comprised of a metal material such as stainless steel, steel, iron, aluminum or other suitable material. Barge 32 is supported in tank 12 by a plurality of upper suspension assemblies 44, 46, 48, 50, 52, 54, 56 and 58 which extend between the barge 32 and the tank 12 as will be described in detail hereinafter. Barge 32 is also supported in tank 12 by eight lower suspension assemblies, identical to suspension assemblies 44, 46, 48, 50, 52, 54, 56 and 58, which are positioned below suspension assemblies 44, 46, 48, 50, 52, 54, 56 and 58.

The numeral 59 refers to a nuclear reactor which is positioned in barge 32 so as to close the open end 41 of barge 32 as will be explained in detail hereinafter. Reactor 59 includes an upstanding containment member 60 which has a cylindrical body portion 62, a hemi-spherical upper end 64 and a hemi-spherical lower end 66. Containment member 60 is comprised of stainless steel or other suitable material. Containment member 60 is positioned at the open end 41 of barge 32 with the sides of containment member 60 being in engagement with the ends 42 and 43 of side walls 36 and 38 respectively of barge 32 and being secured thereto by welding or the like to close the open end 41 of barge 32. The positioning of the containment member 60 as just described causes the outer side of containment member 60 to be in contact with the water 30 in tank 12. Containment member 60 defines a sealed interior compartment 68.

Figure 3:
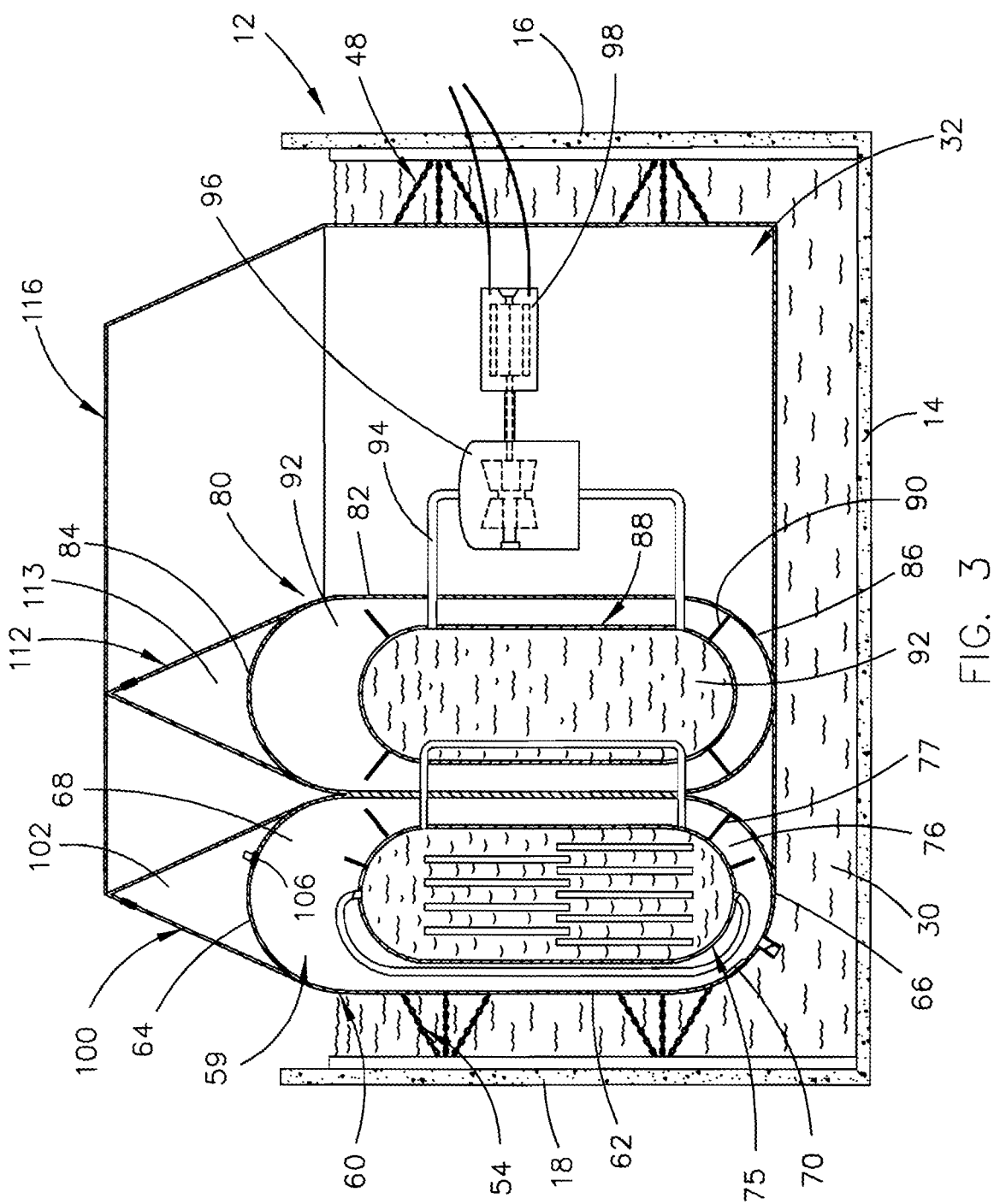
FIG. 3 is a sectional view illustrating conical-shaped members mounted on the upper ends of the nuclear reactor with a roof extending thereover.
Figure 4:
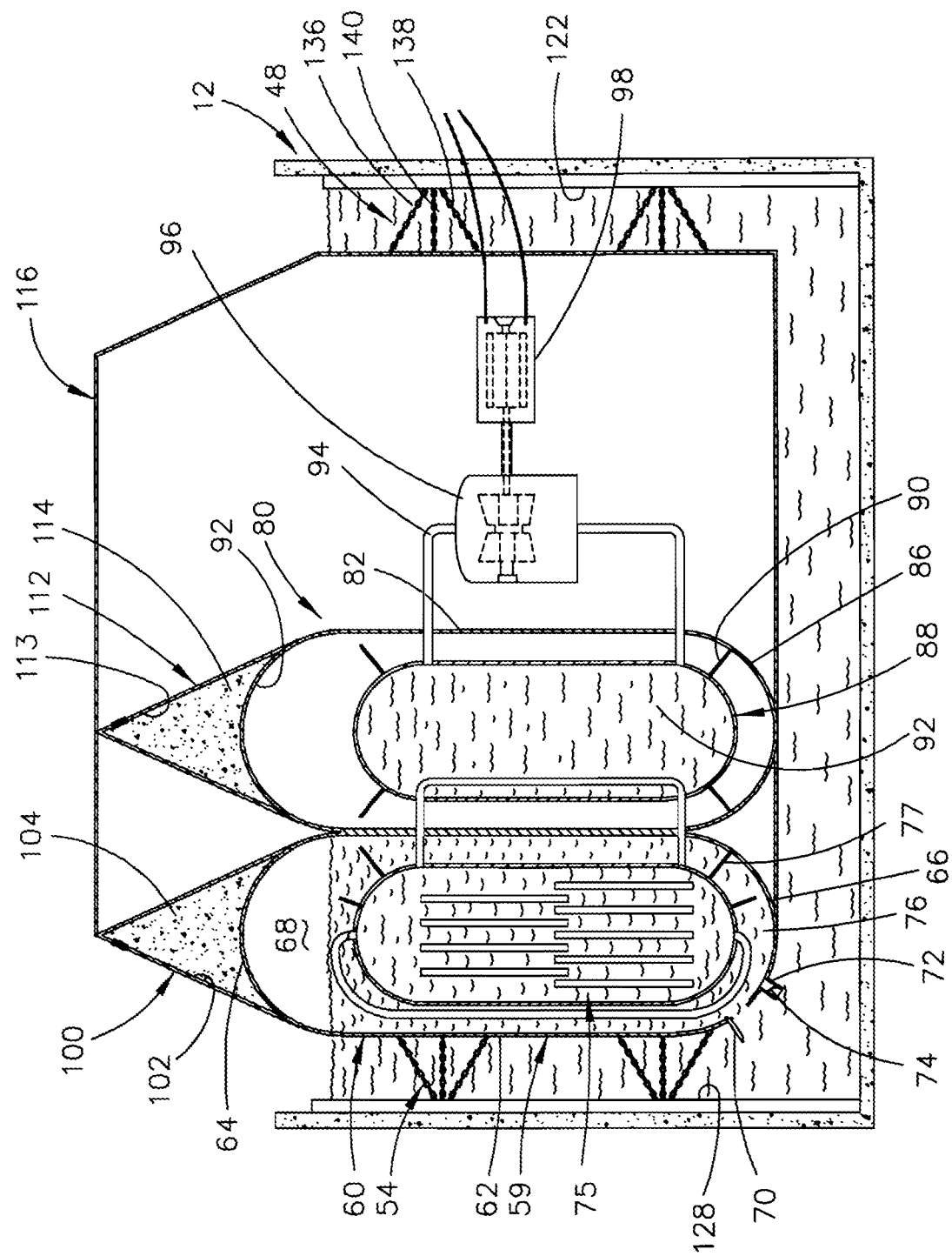
FIG. 4 is a sectional view similar to FIG. 3.
Figure 5:
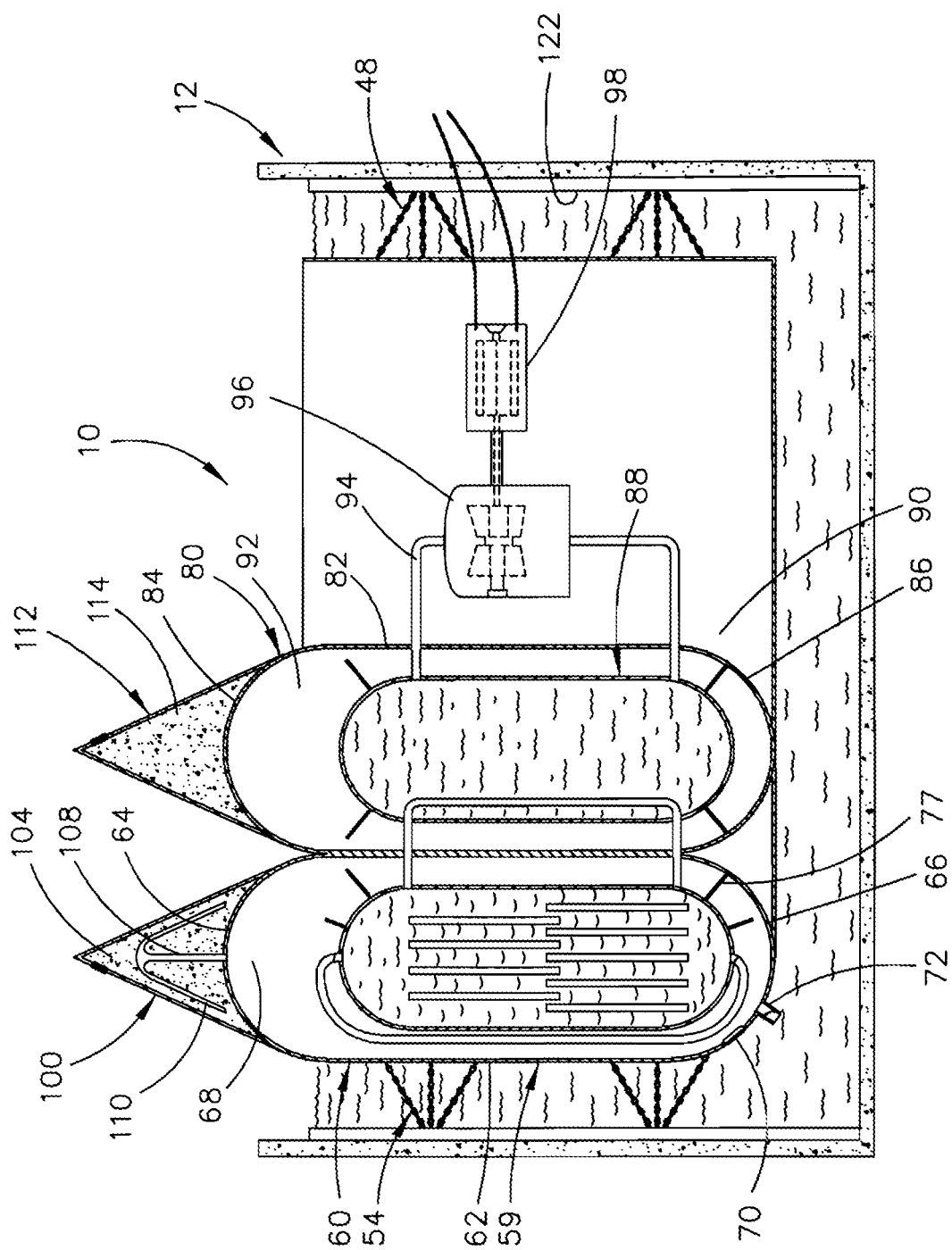
FIG. 5 is a sectional view similar to FIG. 3.
Figure 6:
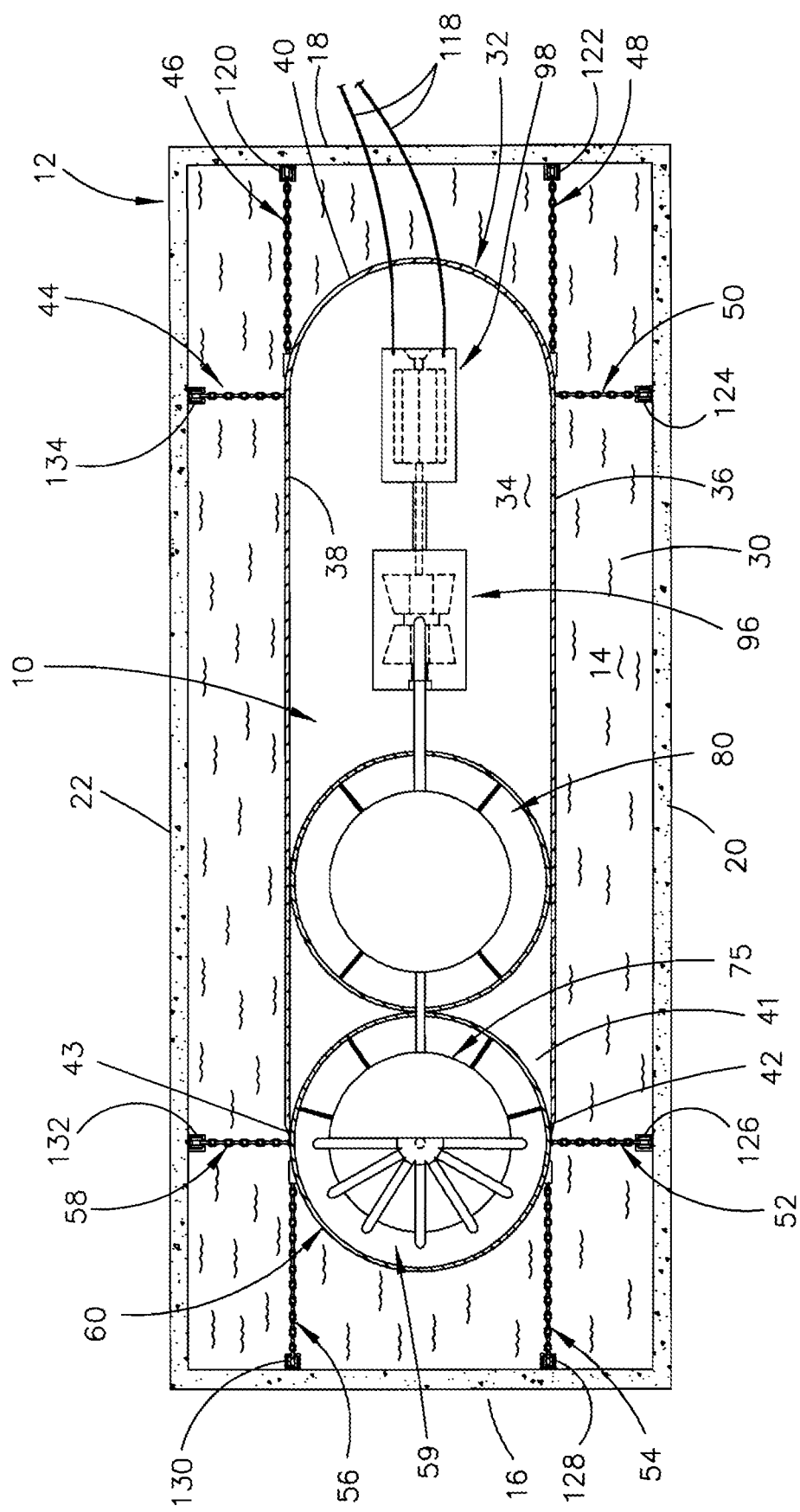
FIG. 6 is a sectional view which illustrates suspension assemblies which suspend the barge in the water-filled tank.

Containment member 60 has a hatch 70 mounted therein as seen in FIG. 3. Containment member 60 also has a pipe 72 extending from the lower end thereof which is in fluid communication with the interior compartment 68. A normally closed one-way valve 74 is imposed in pipe 72.

A reactor vessel 75 is positioned in compartment 68 and has an interior compartment 76. Vessel 75 is supported in compartment 68 by braces 77 which extend between the exterior of reactor vessel 75 and the interior side of containment member 60 as seen in FIG. 3.

The numeral 80 refers to an upstanding heat exchanger which is positioned adjacent containment member 60 as seen in the drawings. Heat exchanger 80 includes a body section 82, an upper section 84 and a lower section 86. Heat exchanger 80 is comprised of a metal material such as stainless steel or other suitable material. A vessel 88 is positioned within heat exchanger 80 and is supported therein by braces 90 extending therebetween. Vessel 88 defines an interior compartment 92. A tube 94 interconnects the reactor vessel 75 and the vessel 88 of heat exchanger 80 as seen in the drawings. The heat exchanger 80 is connected to a turbine 96 or other device which is connected to a generator 98 or other structure.

A hollow metal cone 100 is mounted on the hemispherical upper end 64 of containment member 60. Cone 100 is comprised of stainless steel, steel or other suitable material. Cone 100 has an interior compartment 102 which is preferably filled with a filter material 104 which not only may serve as a filtration bed but serves as an impact absorber should the cone 100 be struck by an aircraft or a missile. The cone 100, if struck by an aircraft or missile, will disintegrate or tear apart the aircraft or missile and deflect the aircraft or missile away from the cone 100. An outlet pipe 106 may be provided in the upper end of containment member 60 to permit steam or the like to pass upwardly therethrough onto the filtration material 104.

The cone 100 may also have a discharge tube assembly 108 extending upwardly from pipe 106 and which has discharge tubes 110 extending downwardly and outwardly from the upper end of tube 108.

A metal cone 112 extends upwardly from the upper end of heat exchanger 80 and is filled with an impact absorbing material 114. Cone 112, if struck by an aircraft or missile, will disintegrate the aircraft or missile in the same manner as the cone 100.

A roof 116 extends over the cones 100, 112 and the barge 32 to hide the reactor 59 and the heat exchanger 80 from view. Thus, if an aircraft is attempting to strike the reactor 59, the pilot of the aircraft will not be able to determine the exact location of the reactor 59.

A pair of vertically disposed guide tracks or channels 120 and 122 are secured to the inner side of end wall 18. A pair of vertically disposed guide tracks or channels 124 and 126 are secured to the inner side of side wall 20. A pair of vertically disposed guide tracks or channels 128 and 130 are secured to the inner side of end wall 16. A pair of vertically disposed guide tracks or channels 132 and 134 are secured to the inner side of side wall 22. Each of the guide tracks 120, 122, 124, 126, 128, 130, 132 and 134 have an upper wheel and a lower wheel vertically movable therein. The guide tracks 134, 120, 122, 124, 126, 128, 130 and 132 form a part of the suspension assemblies 44, 46, 48, 50, 52, 54, 56 and 58 respectively.

Inasmuch as the suspension assemblies 44, 46, 48, 50, 52, 54, 56 and 58 of FIGS. 1-6 are identical except for length, only suspension assembly 48 will be described in detail. Suspension assembly 48 includes an upper chain member 136, a lower chain member 138 and an intermediate chain member 140. The outer ends of chain members 136, 138 and 140 are secured to the upper wheel in guide track 122. The inner ends of chain members 136, 138 and 140 are secured to the barge 32. As seen, upper chain member 136 extends upwardly and inwardly from guide track 122 to barge 32. As also seen, lower chain member 138 extends downwardly and inwardly from guide track 122 to barge 32. Further, as seen, intermediate chain member 140 extends horizontally inwardly from guide track 122 to barge 32. The suspension assembly below suspension assembly 46 would be similarly attached to the lower wheel in guide track 122 and the barge 32. The other suspension assemblies would be attached to the guide tracks 124, 126, 128, 130, 132 and 134 and the barge 32.

The suspension assemblies 44, 50, 56 and 58 of FIGS. 1-6 are identical. The suspension assemblies 46, 48, 54 and 56 of FIGS. 1-6 are identical. The only difference between the suspension assemblies 44, 50, 56, 58 and the suspension assemblies 46, 48, 54 and 56 is that the suspension assemblies 46, 48, 54 and 56 are somewhat longer than the suspension assemblies 44, 50, 56 and 58.

FIGS. 7 and 8 illustrate a portion of the subject matter of this application. As stated hereinabove, some of the barges having nuclear reactors therein which are very heavy and will not float in the tank 12. Thus, a plurality of counter weight assemblies 142 are provided which interconnect the barge 32 with the tank 12 to provide a lifting force to the barge 32 thereby increasing the buoyancy of the barge 32.

Each of the counter weight assemblies 142 of FIG. 7 includes a pulley 144 which is rotatably secured, about a horizontal axis, to the respective side wall of the tank 12. As seen in FIG. 7, the pulley 144 at the right side of FIG. 7 is mounted on wall 20 of tank 12 and the pulley 144 at the left side of FIG. 7 is mounted on wall 22 of tank 12. Each of the counter weight assemblies 142 of FIG. 7 includes a cable 146 having end 147 thereof secured to the barge 32. Cable 146 extends upwardly from barge 32 and passes over pulley 144 and thence downwardly therefrom. A counter weight 148 is connected to end 150 of cable 146. In FIG. 7, the counter weights 148 have the same weights.

Although FIG. 7 illustrates that the counter weight assemblies are attached to opposite sides of the tank 12, there normally will be a pair of counter weight assemblies attached to each of the ends of the barge 32. Further, there may be a plurality of counter weight assemblies attached to each side of the barge 32 and to each end of the barge 32.

FIG. 8 illustrates the situation wherein the right side of barge 32 is heavier than the left side of barge 32. In that case, the counter weight 148A will be larger and heavier than the counter weight 148 at the left side of the barge 32 to maintain the barge 32 in a level position. Further, if one end of the barge 32 is heavier than the other end of the barge 32, a heavier counter weight will be used at the heavy end of the barge 32 to maintain the barge 32 in a level position.

Figure 9:
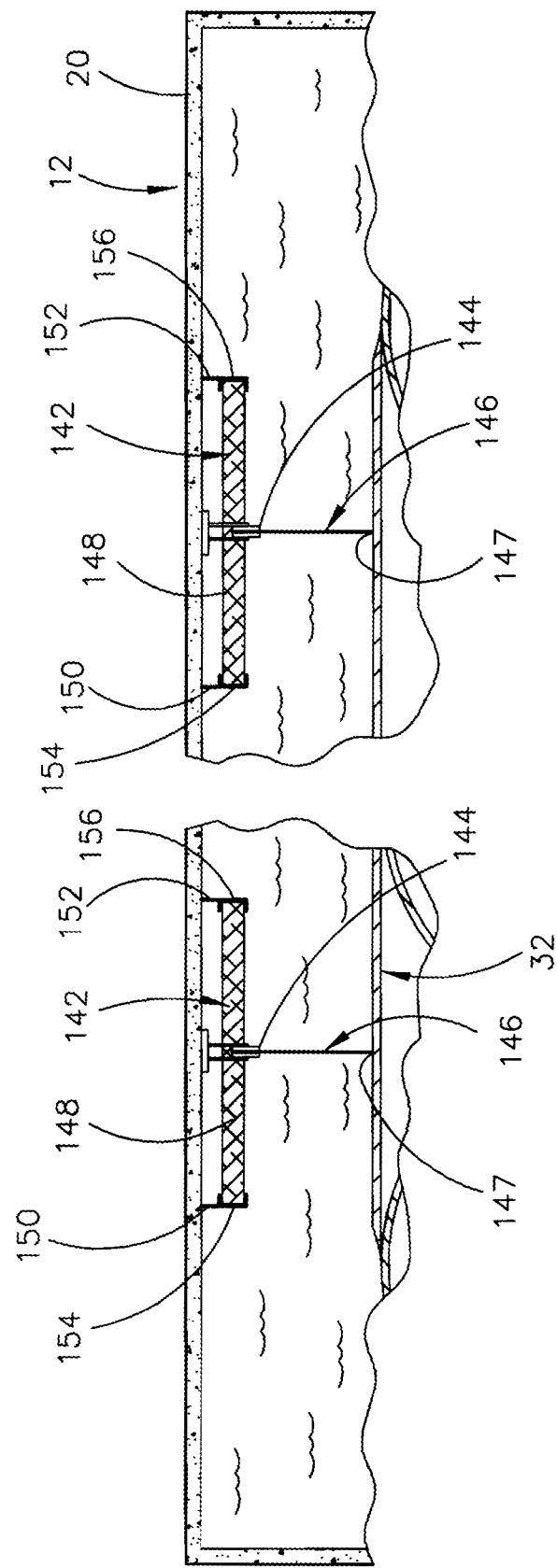
FIG. 9 is a partial sectional view of a pair of counter weight assemblies which are mounted in channels secured to one of the walls of the tank.

Referring now to FIG. 9, structure is provided to prevent horizontal movement of the counter weight assemblies in the event of an earthquake. Referring to the left hand counter weight assembly 142, a pair of elongated and vertically disposed brackets 150 and 152 are secured to the wall 20 of tank 12. An elongated and vertically disposed channel 154 is secured to bracket 150. An elongated and vertically disposed channel 156 is secured to bracket 152. The channels 154 and 156 embrace the ends of the counter weight 148. The channels 154 and 156 permit counter weight 148 to vertically move therein. The channels 154 and 156 prevent horizontal movement of the counter weight 148 in the event of an earthquake. The structure at the right side of FIG. 9 is identical to the structure at the left side of FIG. 9 and will not be described in detail.

Figure 10:
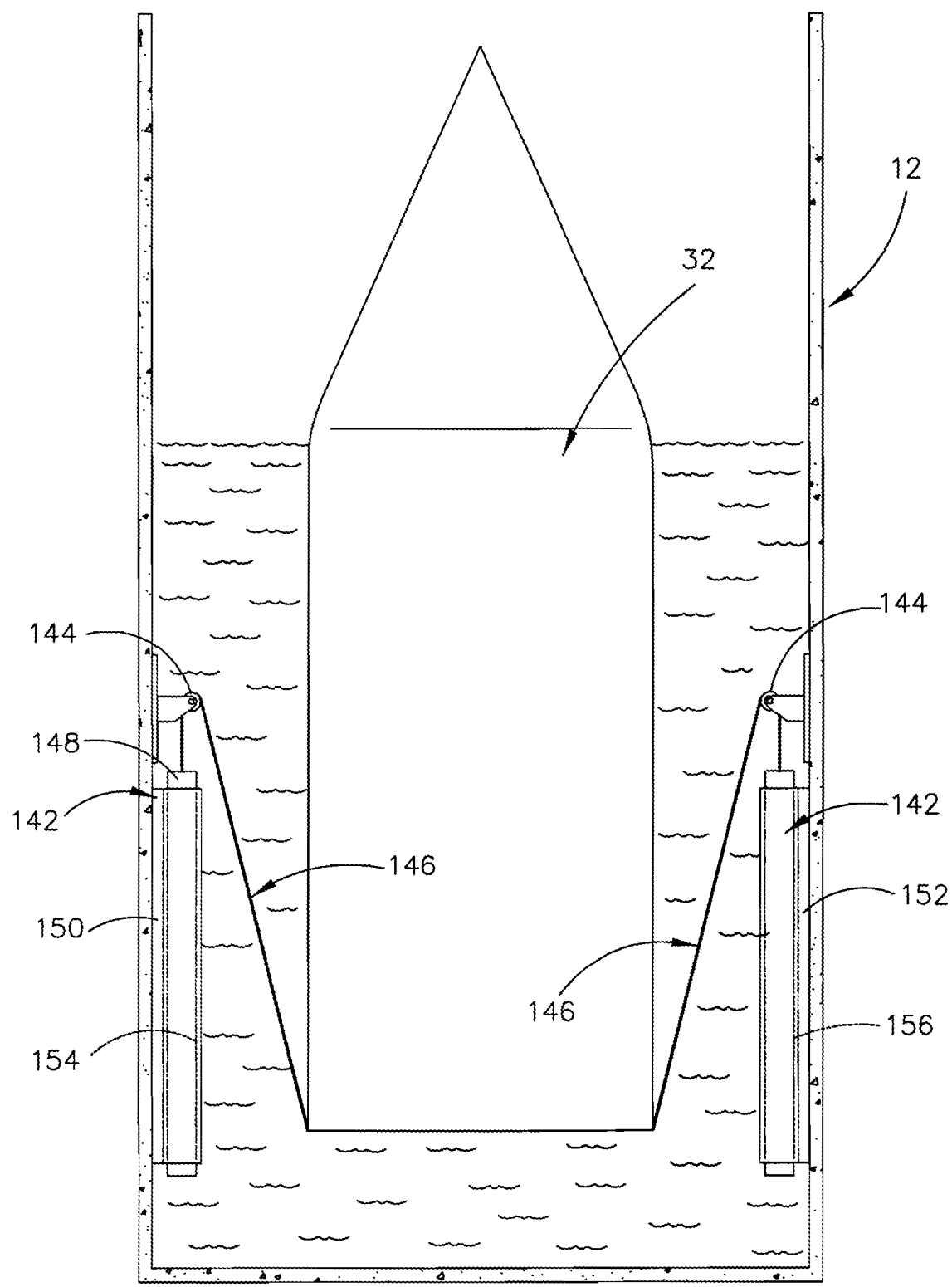
FIG. 10 is a partial sectional view which illustrates a pair of counter weight assemblies which are mounted in channels secured to the opposite walls of the tank.

FIG. 10 is a partial sectional view illustrating the barge 32 and which is supported by the structure of FIG. 9.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A floating nuclear reactor, comprising:
   a tank having water therein with the tank including;
   (a) a bottom wall having a first end, a second end, a first side and a second side;
   (b) a first end wall, having a first side, a second side, a lower end and an upper end, extending upwardly from said first end of said bottom wall;
   (c) a second end wall, having a first side, a second side, a lower end and an upper end, extending upwardly from said second end of said bottom wall;
   (d) a first side wall, having a first end, a second end, a lower end and an upper end, extending between said first ends of said first and second end walls;
   (e) a second side wall, having a first end, a second end, a lower end and an upper end, extending between said second ends of said first and second end walls;
   each of said first end wall, said second end wall, said first side wall and said second side wall of said tank having inner and outer sides;
   a barge, having a first end, a second end, a first side and a second side, floatably positioned in said tank;
   a nuclear reactor positioned on said barge;
   a plurality of counter weight assemblies operatively connected to said tank and said barge which are configured to provide a lifting force on said barge;
   each of said counter weight assemblies including:
   (a) an elongated and vertically disposed first bracket secured to a first wall of said tank;
   (b) an elongated and vertically disposed second bracket secured to the first wall of said tank so as to be horizontally spaced from said first bracket;
   (c) an elongated and vertically disposed first channel, having upper and lower ends, secured to said first bracket so as to be spaced from said first wall;
   (d) an elongated and vertically disposed second channel, having upper and lower ends, secured to said second bracket so as to be spaced from said first wall;
   (e) a flat and rectangular counter weight having an upper end, a lower end, a first side, a second side, an outer side and an inner side;
   (f) said counter weight positioned between said first and second channels with said first side of said counter weight being vertically slidably received in said first channel and with said second side of said counter weight being vertically slidably received in said second channel;

(g) a pulley rotatably secured to said tank, about a horizontal axis, between said upper ends of said first and second channels;

(h) an elongated and flexible cable having first and second ends;

(i) said first end of said cable being secured to said barge; and (j) said cable extending from said barge over said pulley on said tank and thence downwardly therefrom for connection to said counter weight.

2. The floating nuclear reactor of claim 1 wherein the plurality of counter weight assemblies include a first counter weight assembly operatively secured to said first side of said barge and a second counter weight assembly operatively secured to said second side of said barge.

3. The floating nuclear reactor of claim 1 wherein the plurality of counter weight assemblies include a first counter weight assembly operatively secured to said first end of said barge and a second counter weight assembly operatively connected to said second end of said barge.

4. The floating nuclear reactor of claim 2 wherein each of said first and second counter weight assemblies include a counter weight and wherein one of said first and second counter weight assemblies has a heavier counter weight than the other counter weight assembly.

5. The floating nuclear reactor of claim 1 wherein the plurality of counter weight assemblies include at least two counter weight assemblies are connected to said first end wall of said barge and said first end wall of said tank and at least two counter weight assemblies are connected to said second end wall of said barge and said second end wall of said tank and at least two counter weight assemblies are connected to said first side wall of said barge and said first side wall of said tank and at least two counter weight assemblies are connected to said second side wall of said barge and said second side wall of said tank.

6. The floating nuclear reactor of claim 3 wherein each of said first and second counter weight assemblies include a counter weight and whereas one of said first and second counter weight assemblies has a heavier counter weight than the other counter weight assembly.

7. The floating nuclear reactor of claim 1 wherein the first channel and the second channel embrace the counter weight to limit all horizontal movement of said counter weight.

\* \* \* \* \*